United States Patent [19]

Itoh

[11] 4,096,575
[45] Jun. 20, 1978

[54] DELAY TIME COMPENSATION INCORPORATING TWO SENSING DEVICES

[75] Inventor: Takane Itoh, Yokohama, Japan

[73] Assignee: Nissan Motor Company, Limited, Japan

[21] Appl. No.: 784,854

[22] Filed: Apr. 5, 1977

[30] Foreign Application Priority Data

Apr. 8, 1976 Japan ................................. 51-40062

[51] Int. Cl.$^2$ ............................................ G01D 18/00
[52] U.S. Cl. .................................... 364/571; 250/252; 328/162
[58] Field of Search ............... 364/572, 724, 571, 825; 328/155, 133, 162, 149; 250/252, 272; 307/293; 73/1 R, 359 R, 359 A, 355 R, 355 EM; 340/2

[56] References Cited

U.S. PATENT DOCUMENTS

| 3,374,435 | 3/1968 | Engel | 328/162 |
| 3,946,211 | 3/1976 | Jenkins, Jr. | 364/572 |

*Primary Examiner*—Malcolm A. Morrison
*Assistant Examiner*—Errol A. Krass
*Attorney, Agent, or Firm*—Robert E. Burns; Emmanuel J. Lobata; Bruce L. Adams

[57] ABSTRACT

A delay time compensation circuit includes a pair of first and second sensing devices having different time constant values. The outputs from the sensing devices are each differentiated and at the same time compared to provide a difference signal. Both differentiated and difference signals are processed into an output which represents a value to compensate for errors resulting from the first-order time lag of the sensing devices. The compensating output is added to the output from the first sensing device.

5 Claims, 1 Drawing Figure

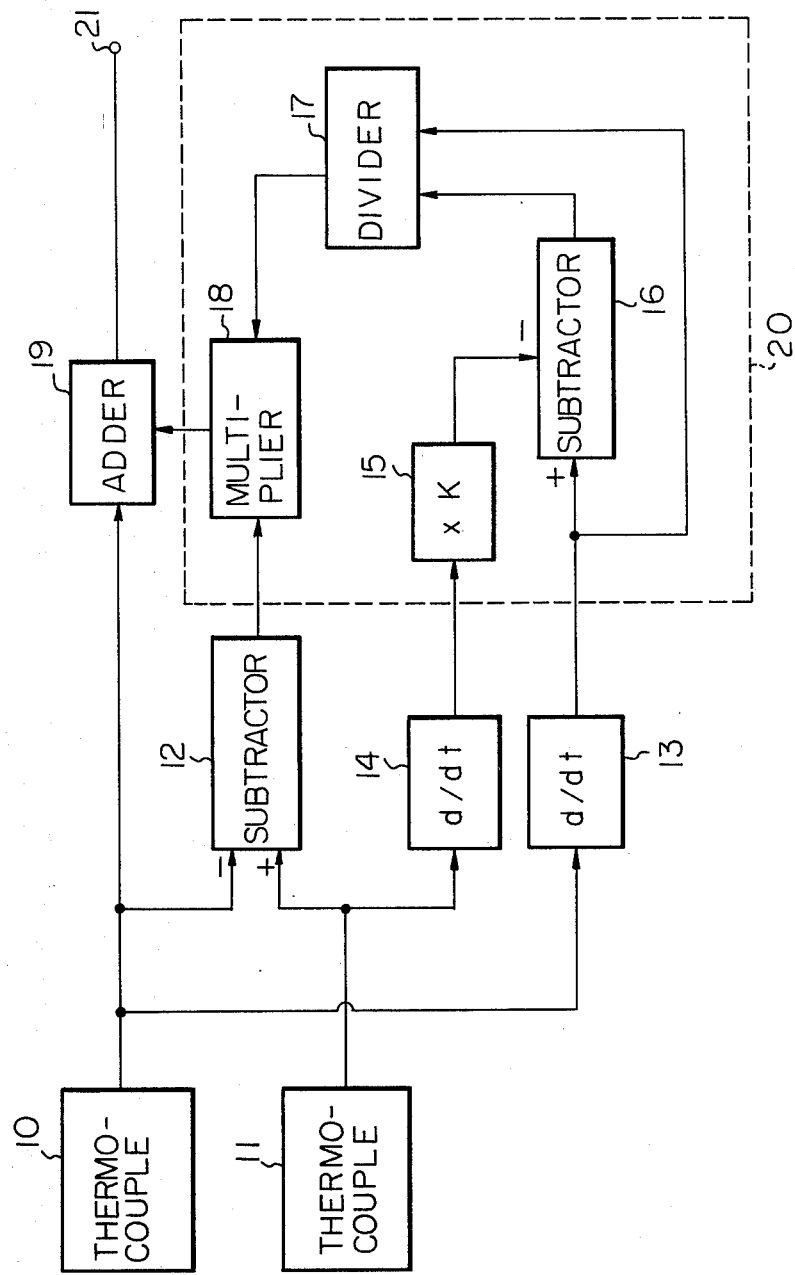

DELAY TIME COMPENSATION INCORPORATING TWO SENSING DEVICES

FIELD OF THE INVENTION

The present invention relates to radiation energy detectors and in particular to a delay compensation circuit capable of compensating for errors introduced as a result of the inability of sensing devices to respond to the rapidly changing external condition.

BACKGROUND OF THE INVENTION

In applications where sensors are located at points of measurement to provide a faithful representation of the measured variables, it is necessary that the output be free of errors resulting from the inability of the sensors to respond to the rapidly changing input variables. Such measurement systems can be approximated by mathematical model of first-order time lag. For example, a system which employs a thermocouple for the measurement of temperature, the output represents a first-order delayed response to the temperature to be measured. It is desirable that this delay time be as small as possible. To a certain degree, this requirement can be met by reducing the thermal capacity of the dissimilar metals employed. However, further reduction of thermal capacity necessitates the use of filament-like thin metal strips which can result in a short lifetime of the thermocouple. When the environment of which the temperature is measured is a mass of fluid which passes the point of measurement at a constant flow rate, it is relatively easy to compensate for the delay time since the time constant of the first-order time lag remains constant. However, a variation of the flow rate can cause the time constant value to vary considerably, and as a result a measurement of the flow rate is additionally required to provide accurate compensation of the delay time.

SUMMARY OF THE INVENTION

An object of the present invention is therefore to provide an electronic radiation energy detector circuit which provides an output free from errors resulting from the slow response characteristic of radiation sensitive elements.

Another object of the invention is to provide a delay-time compensating circuit which compensates for the first-order time lag of a sensing element circuit which permits measurement of radiation energy emanated from a mass of fluid which passes at varying flow rates through a point of measurement without the need for measuring the flow rate.

A further object of the invention is to provide a radiation energy detector which includes first and second radiation sensitive elements such as thermocouple temperature sensors having different time constant values, a logic operational circuit which processes the outputs from the thermocouple sensors to generate a compensating signal that represents the difference between the temperature to be measured and the output from the first sensor, and an adder for providing summation of the compensating signal to the output from the first sensor.

BRIEF DESCRIPTION OF THE DRAWING

These and other objects, features and advantages of the invention will be understood from the following description taken in conjunction with the accompanying sole drawing which illustrates a schematic circuit block diagram of the radiation energy detector embodying the invention.

DESCRIPTION OF THE PREFERRED EMBODIMENT

In the drawing, an embodiment of the present invention is schematically illustrated as comprising first and second thermocouples designated by numerals 10 and 11, respectively, which are disposed in the inlet port of a gas turbine (not shown). Each of these temperature sensors has a different value of thermal lag or time constant from the other. The sensing or measuring junction of each thermocouple is placed at the same point where temperature is to be measured and the other junction, called the reference or cold junction, is maintained at a known reference temperature. The voltage developed between the two junctions of thermocouple 10 is applied to the inverting input of a differential amplifier or subtractor 12 and the voltage delivered from thermocouple 11 is applied to the noninverting input of the subtractor 12. The outputs from these thermocouples are also coupled to differentiator circuits 13 and 14, respectively. The outputs from the subtractor 12, first and second differentiators 13 and 14 are fed into a processing circuit shown in a broken-line rectangle 20. The processing circuit 20 includes a second subtractor 16, a multiplier 15 which multiplies the input signal applied thereto by the factor of "k", i.e. the ratio of the time constant of the first thermocouple 10 to the time constant of the second thermocouple 11. The processing circuit further includes a division circuit 17 which divides a dividened received from the output from the differentiator 13 by a divisor received from the output from the second subtractor 16 and supplies its output to one input of a multiplier 18 which receives the other input from the subtractor 12.

Differentiator 14 provides its differentiated output to the multiplier 15, and thence to the inverting input of the subtractor or differential amplifier 16.

Suppose that the thermal input to the thermocouples 10 and 11 be denoted by $x(t)$ and the outputs therefrom denoted by $y_1(t)$ and $y_2(t)$, respectively. Subtractor 12 delivers an output representing the difference between the voltage outputs from thermocouples, i.e. $y_2(t) - y_1(t)$, to an input of a multiplier 18, to the other input of which is also applied the output from the division circuit 17. The output from the division circuit 17 is fed to an input of an adder 19 to which is also connected the output from the thermocouple 10.

The operation of the circuit of the invention will now be comprehended by the following explanation. Suppose that the thermocouples 10 and 11 possess time constant values $T_1$ and $T_2$, respectively, the following relations hold:

$$T_1 \cdot (dy_1/dt) + y_1 = x \quad (1)$$

$$T_2 \cdot (dy_2/dt) + y_2 = x \quad (2)$$

$$T_1 \cdot (dy_1/dt) + y_1 = T_2 \cdot (dy_2/dt) + y_2 = x \quad (3)$$

Therefore, $$T_1 = \frac{y_2 - y_1}{\frac{dy_1}{dt} - k\frac{dy_2}{dt}} \quad (4)$$

where, $k = T_2/T_1$. By substituting $T_1$ of Equation (3) with Equation (4), the following equation is obtained:

$$x = y_1 + (y_2 - y_1)/(1 - k \cdot dy_2/dy_1) \quad (5)$$

Since, $dy_2/dy_1$ is rewritten as $(dy_2/dt)/(dy_1/dt)$, Equation (5) can be rewritten as $$x = y_1 + \frac{\frac{dy_1}{dt}}{\frac{dy_1}{dt} - k \cdot \frac{dy_2}{dt}} (y_2 - y_1) \quad (6)$$

Subtractor 16 thus delivers an output representing $dy_1/dt - k \cdot dy_2/dt$ which serves as a dividened for the division circuit 17 which receives a divisor from the differentiator 13 to provide its output to the multiplier 18. The multiplier in turn performs multiplication of two input signals, one from the division circuit 17 and the other from the subtrator 12. Therefore, the output from the multiplier 18 represents the difference between the thermal energy or temperature to be measured and the output from the first thermocouple 10. By adding the output from the processing circuit 20 to the output from the first thermocouple 10 in the adder 19, the output signal appearing at terminal 21 is free from the error resulting from the inability of the sensors to respond to the variation of the variable to be measured and thus faithfully represents the temperature to be measured.

What is claimed is:

1. A delay compensation circuit comprising:
   first and second sensing devices each having a different time constant value of the first order time lag;
   first and second differentiators connected to said first and second sensing devices, respectively;
   a subtractor connected to said first and second sensing devices to provide an output representing the difference between the outputs from said devices;
   a processing circuit receptive of the outputs from said first and second differentiators and said subtractor for generating an output which represents the difference between a physical quantity to be measured and the output from said first sensing devices; and
   a summation circuit for providing summation of the output from said first sensing device and the output from said processing circuit.

2. A delay compensation circuit as claimed in claim 1, wherein said processing circuit includes a second subtractor for generating an output representing the difference between the outputs from said first and second differentiators, a divider for dividing the output from said second differentiator by the output from said second subtractor, and a multiplier for providing multiplication of the output from said first-mentioned subtractor and the output from said divider.

3. A delay compensation circuit as claimed in claim 2, wherein said processing circuit includes means for multiplying the output from said first differentiator by the ratio of the time constant value of said first sensing device to the time constant value of said second sensing device, the output from said multiplying means being connected to one input of said second subtractor.

4. A delay compensation circuit as claimed in claim 1, wherein each of said first and second sensing devices comprises a thermocouple.

5. In a radiation energy detector having a pair of radiation sensitive elements each having a different time constant of the first-order time lag from the other element, the combination comprising:
   first and second differentiators connected to said first and second radiation sensitive elements, respectively;
   a subtractor connected to said first and second radiation sensitive elements to provide an output representing the difference between the outputs from said elements;
   a processing circuit receptive of the outputs from said first and second differentiators and said subtractor for generating an output which represents the difference between the radiation energy to be measured and the output from said first sensitive element; and
   a summation circuit for providing summation of the output from said first radiation sensitive element and the output from said processing circuit.

* * * * *